United States Patent Office 3,026,255
Patented Mar. 20, 1962

3,026,255
METHOD OF PROTECTING METAL SURFACES
Marcel Riou, Neuilly, and Henri Richaud, Chambery, France, assignors to Pechiney Compagnie de Produits Chimiques et Electrometallurgiques, Paris, France
No Drawing. Filed Apr. 9, 1958, Ser. No. 727,246
Claims priority, application France Apr. 12, 1957
16 Claims. (Cl. 204—33)

The invention relates to a new method for protecting metal surfaces, involving a new use of chemical compounds therefor.

A simplified flow diagram of the method of the invention is as follows.

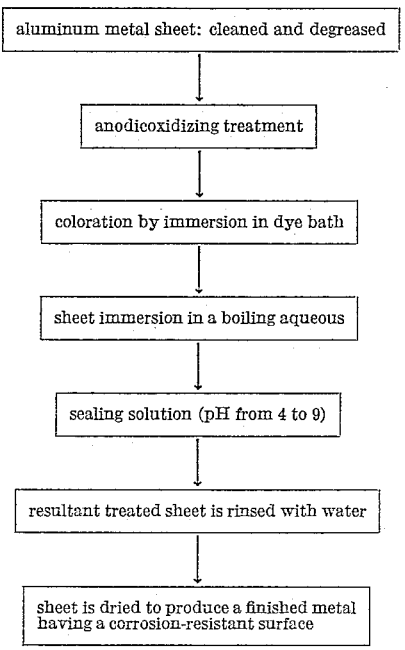

Numerous methods are known in the art of protecting metallic surfaces; thus, it is well known to coat a metallic surface with a resin film, or to cover the surface with a layer of oxide or other compounds and impregnating that layer eventually with certain agents which are usually referred to as "sealing agents" in the art.

Inorganic protective layers which are obtained by oxidation, phosphatation, sulfurization, chromatization, or other chemical or electrolytical operations, are improved also by such treatments as, in particular in the case of oxides formed on light metals, dipping into boiling water or treatment with alkaline solutions, silicates, fatty acids, sulfonated fatty acids, and the like.

The particular process to be employed in each case depends largely upon the conditions under which the desired protection treatment is to be carried out. A frequent difficulty is that of obtaining a sufficiently adherent protective coating which is at the same time tough, impermeable to corrosive agents and resistant to the latter.

Another drawback of electrolytically protective layers formed on metal surfaces, is a certain typical odor.

Yet another drawback of the known methods of treating protective layers on metal surfaces with sealing or similar agents is the requirement of applying high temperatures, of at least 50° C. and usually much higher, above 100° C., which high temperatures are not withstood by many protective layers, for instance by those containing dyes.

It is, therefore, an object of the present invention, to provide an important improvement which makes it possible to obtain inorganic protective layers as the surfaces of metallic articles, which offer an increased resistance to wear and to corrosion which are free from the undesirable odor of electrolytically produced oxide layers, and which are substantially unhygroscopic.

It is a further object of our invention to provide for metallic surfaces protected with inorganic coatings which have an attractive, decorative appearance, and show an improved property of causing the safe adherence of paints, varnishes, or plastic films thereon.

It is finally an object of the invention to provide a method of sealing protective metallic surfaces bearing an inorganic coating susceptible to heat treatment, by treating the latter coating at temperatures below 50° C.

The new method according to our invention, which permits to avoid the above-mentioned drawbacks, and achieves the aforesaid objects, is based on our discovery that the adsorption of an organic substance as a sealing agent in an inorganic layer on the surface of a metal is particularly strong and shows the above-mentioned excellent properties, when the sealing agent used is a polymerized organic substance consisting of homopolymeric, interpolymeric, or copolymeric molecules which fulfill a number of conditions:

(1) Each monomeric unit in the polymer molecule of the sealing agent must contain a chain of at least two carbon atoms being linked to each other by a saturated bond, i.e. one electron pair.

(2) Each molecule contains at least two acidic groups such as the carboxylic group —COOH, the sulfonic group —$SO_3H$, and the phosphonate group —$PO_3H_2$.

(3) Each monomeric unit must contain as branches at least two alkyl or aryl radicals having a molecular weight above 15, i.e. being each heavier than the methyl group $CH_3$ and preferably above 29 ($C_2H_5$); and two or more of these branches may be constituted by the aforesaid carboxylic groups in accordance with (2). In fact, methyl groups as branches are unsatisfactory, and it is preferred that the branches, other than the carboxylic group, contain more than 2 carbon atoms and are therefore, for instance, propyl, butyl, pentyl, phenyl, cyclohexyl, and the like radicals.

(4) When the branches are thus exclusively carboxylic groups and no other acidic groups are contained in the monomeric unit, at least two of these carboxylic groups must be attached in alpha position as follows:

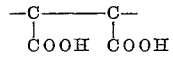

Thus, for instance, vinyl ester, maleic anhydride interpolymers, the monomeric unit of which contains 3 carboxylic groups, two of which are linked to neighboring carbon atoms, are far superior, when used as sealing agents, than the polyacrylates disclosed in the art, which contain carboxylic groups linked to carbon atoms in beta position relative to each other.

(5) All acidic groups including the carboxylic groups may be free acid groups or combined in the form of esters and salts such as alkaline metal or amine salts.

(6) The above-defined sealing agents should have molecular weights greater than 200 and preferably exceeding 450. Optimal results are achieved with sealing agents having a molecular weight exceeding 900, while the upper limit for the molecular weight is determined only by the requirement of solubility of the agent in water or in an organic solvent.

(7) The organic substance serving as a sealing agent in the method according to the invention, should be at least slightly soluble to permit its application to the metal surface to be protected. Weak solutions either in water or in an organic solvent, in which the sealing agent is present in amounts of at least 0.01% by weight, can be used, while concentrations of 0.1% to 15% by weight are preferred.

(8) The branches mentioned under (3) may also comprise the radicals nitrile —CN, hydroxyl —OH, aldehyde —CHO, or the amino group —NH$_2$.

When the number of electro-positive or electro-negative branch groups in the monomeric unit of the polymer is sufficiently high, already a dimeric or trimeric polymer permits to obtain excellent results. Where the number of these branch groups per monomeric units is small, and comprises, for instance, only one sulfonic group per monomeric unit, it is preferred to use polymers of a higher polymerization grade.

Thus, the importance of using polymers having large molecules in the method of sealing inorganic layers and in particular, metal oxide layers on metallic surfaces becomes apparent when, for instance, using salts of polystyrene sulfonates and similar polymeric substances to be discussed further below. The results obtained with these products are far superior in every respect to those obtained in the art by the known use of alkyl or aryl sulfonates composed of simple molecules each of which contains a single sulfonic group.

Practically the simplest manner of treating inorganic layers on metallic surfaces with the described substances consists in dipping the metal articles to be treated into solutions of one or more of said substances, for a length of time such that the surface layer of the article absorbs a certain amount of the substance; after the withdrawal of the article from the solution, the excess of the latter is removed from the treated surface which is generally rinsed, so that only the amount of directly adsorbed sealing substance remains therein.

In general, the increase of the weight of an article when treated by the process according to the invention is from 0.1 gram to 15 grams per square meter of the treated surface. In most cases, this increase is comprised between 1 gram and 5 grams per square meter.

The treatment may also be carried out by spreading or spraying the solutions on the surface of the article, and then draining or wiping, and generally rinsing it.

It is preferred that the protective organic substances containing acidic groups are in the form of their salts or esters. The choice of an adequate pH is very important for carrying out the new method successfully because the velocity of the fastening of the substance in the adsorbent layer, as well as the qualities of the layer treated, depend upon the pH of the solution; on the other hand, the optimum value of pH varries in relation with the nature of the inorganic layer and with that of the selected sealing agent. When the inorganic layer comprises oxides of trivalent metals such as aluminum, it is in general advisable to work in the vicinity of pH=7, but the admissible range of pH extends at least between 4 and 9, and preferably between 5 and 8.

According to the nature of the articles and the substances involved, the solution may comprise as a solvent, water or one or more organic liquids such as, for example, alcohols, chlorinated hydrocarbons, esters, ketones and the like; mixtures of water with organic liquids are suitable as solvents particularly in those cases where the sealing agent is not sufficiently soluble in water alone. From an economical point of view, aqueous solutions are preferred.

Highly improved surfaces can be obtained by using solutions containing together several of the sealing agents according to the invention.

The treatment may be effected at temperatures extending from room temperature up to 100° C. in the case of aqueous solutions, and even above 100° C. when higher boiling solvents are used. It is, however, possible and preferred to carry out the sealing operation at temperatures below 50° C., for example, between 15° C. and 40° C.; this constitutes an important advantage over the known processes which generally require much higher temperatures which are, for instance, harmful for dyes often used for the purpose of coloring metallic surfaces; moreover, certain layers of inorganic substances produced on metal surfaces suffer from an increase of temperature; in these cases, the method of our invention has the important advantage of permitting treatment at low temperatures.

While the salts of the acidic groups of the sealing substances used in the method according to our invention are chiefly those of sodium, potassium, and ethanolamine, other metals or amines may also be used, provided the respective salts are sufficiently soluble; for example, Mg, Li, Ca, Al, Zn, Fe, Mn or other metal salts may be used, when their solubility exceeds 0.01%. Similarly, esters of a number of alcohols, such as methylic, ethylic, propylic or butylic alcohols, glycols, triols and the like as well as phenols may replace the first named salts.

The method of our invention may be applied to all metals capable of being coated with a thin layer of an adsorbent inorganic substance such as, for instance, the oxide of the base metal itself. The method according to the invention is, therefore, applicable to the surfaces of iron and related metals, light metals such as aluminum, titanium, zinc, copper, zirconium, and other metals, as well as the alloys of these metals.

When the sealing agent according to the invention is of a resinous or waxy character, it may be applied to the surface to be protected by rolling a thin layer thereof onto the metallic surface. Such layer may be particularly useful when an additional layer of a plastic material is to be subsequently applied to the metal surface on top of the inorganic layer treated by the method according to our invention.

Apart from the above-mentioned polystyrene sulfonates, other sulfonated polymeric, interpolymeric or copolymeric substances containing acidic groups which are free or esterified or neutralized with inorganic or organic bases, are sulfonated derivatives of polymethylstyrene, polychlorostyrene, and the like. These substances are described, for instance, by Calvin E. Schildknecht in "Vinyl and Related Polymers" (1952), pages 72 et seq.

These products may have largely varying molecular weights in a range extending from a few thousand to several hundred thousand. Their rate of sulfonation may also vary between large limits; the sulfonation rate is preferably above 0.65 —SO$_3$H groups per monomeric unit in the polymer molecule.

These compounds may be produced as described in J. Org. Chem., 12, No. 1 (1947), by G. B. Bachman and Al., that is by the direct action of SO$_4$H$_2$ on polystyrene.

The preparation may also be carried out according to U.S. Patents 2,031,929, 2,283,236, etc.

Another important class of products suitable for use in the method of the invention, comprises polymers, interpolymers and copolymers of vinyl sulfonic acid. More particularly, interpolymers and copolymers of this acid with one or several esters, such as vinyl acetate, methylmethacrylate, methylchloroacrylate, and the like, and polymers, interpolymers and copolymers of polyvinylbenzene sulfonic acid may be used. The individual polymers from which the aforesaid interpolymers and copolymers can be obtained, are described by Schildknecht, supra, on pages 187 and 645 et seq.

In a further important group of substances suitable for use in the method of our invention, the acidic groups are not sulfonic groups but carboxylic groups. The improved qualities of the sealed inorganic layers obtained by treatment with such substances are due principally to the presence, in the monomeric unit of the sealing agents, of pairs of carboxylic groups. Preferred substances of this type are interpolymers obtained from maleic anhydride as described by Schildknecht, supra, page 67 et seq., with styrene, vinyl acetate (Schildknecht, supra, page 367), vinyl chloride, vinylidene chloride, or similar polymerizable compounds. The resulting polymers are dissolved preferably in aqueous sodium hydroxide solution, for instance, of normal concentration, whereby they are neutralized to form sodium salts of the corresponding acid interpolymers.

Yet another group of suitable substances comprises polyvinylbenzoic acid. Also, polymers of the higher homologues of acrylic acid in which the polymer chains are networks bearing branches having more than two carbon atoms (in particular, the esters of propacrylic acid, butacrylic acid, phenacrylic acid, and heptacrylic acid) lead to sealing effects which are superior to those achieved by the methods described in the art which employ acrylic acid or methacrylic acid polymers.

Finally, the sealing effects achieved by this last-mentioned known method can also be surpassed by using in the method of our invention and instead of acrylic and methacrylic acid polymers, the interpolymers, copolymers, and particularly the substituted derivatives such as the sulfonated derivatives thereof which are obtained by interpolymerization or copolymerization of acrylic acid with acrylic nitrile or with other vinylic compounds such as styrene, vinyl acetate, vinyl chloride and the like.

Many of the sulfonated substances mentioned hereinbefore can be produced by one or the other of the United States Patents 2,300,920; 2,366,007; 2,515,714; 2,527,300; and many others. The sealing agents described hereinbefore may also be used in aqueous or organic solvents containing, in mixture with the aforesaid agents, other substances which are described in our copending application Serial No. 722,856, filed March 21, 1958.

The invention will be further illustrated by a number of examples given below, which are, however, not meant to be limitative in any way:

*Example I*

A plate of aluminum containing 99.5% Al is cleansed, degreased, and then anodically oxidized in a well-known manner; after oxidation, the plate is rinsed and colored in a dyeing bath of "Indigosol Green I.B." (a dyestuff made by Durand & Huguenin of Basel, Switzerland) which is a sulfonic ester of the leuco-derivative of benzene-2, benzene-2'-dimethoxydibenzanthrone. The plate is then immersed for 30 minutes (mins.) in a boiling aqueous solution containing per liter 10 grams (g.) of the sodium salt of a polystyrene sulfonic acid being a derivative of a polystyrene which, when dissolved at 10 percent (%) weight by volume concentration in toluene, shows a viscosity of 2.5 centipoises (cps.) and has a sulfonation rate of 0.92, i.e. an average of 0.92 sulfonic acid groups have been substituted into each monomeric unit of the polymer. The aqueous sodium polymerizate salt solution has a pH of about 7.8. After 30 minutes the plate is withdrawn from the bath, rinsed with water and dried. The oxidic surface of the plate is now very smooth and possesses a highly improved resistance to corrosion. Also, the typical odor of anodically oxidized layers is considerably reduced.

*Example II*

A treatment similar to that in the preceding example is effected with a sealing bath containing per liter 5 g. of the sodium salt of a polystyrene sulfonic acid derived from a polystyrene which shows, when dissolved at a concentration of 10% in toluene, a viscosity of 45.5 cps. The sulfonated polymer has a sulfonation rate of 1, the viscosity of the sodium salt in the form of the above-mentioned aqueous solution is 7 cps., and the bath has a pH of 7.7. The resulting aluminum plate shows the same characteristic improvements as the plate treated according to Example I.

*Example III*

An aluminum plate is treated in the same manner as in Example I. However, the treatment in the sodium polystyrene sulfonate bath is carried out at a temperature of 60° C. for about 6 hours (hrs.). The same results are obtained as in the preceding examples.

*Example IV*

The treatment of an aluminum plate is repeated as in Example I; however, the immersion bath is maintained during the treatment at a temperature of 28° C. and the treatment is continued for about 14 hrs. While the improved properties of the plate are essentially the same as those described in Example I, an additional improvement consists in a particularly vivid and more decorative coloring of the plate.

*Example V*

The treatment of an aluminum plate is carried out in the same manner as described in Example I. However, the sealing bath consists of an aqueous solution containing per liter 5 g. of the sodium salt of a copolymer obtained by the copolymerization of vinyl sulfonic acid, ethyl-vinyl sulfonate, and methyl methacrylate. This copolymer is obtained as described in United States Patent No. 2,348,705. The treatment is carried out at boiling temperature during about 30 minutes. The copolymer has a pH of 8.1 and the plate shows the same improved properties as that treated according to Example I.

*Example VI*

An aluminum plate prepared in the same manner as described in Example I is immersed in a sealing bath consisting of a solution in cyclohexanone containing, per liter of the latter solvent, 5 g. of the sodium polymerizate salt used in Example V; but the bath temperature is maintained at 25° C. and the treatment of the plate continued for 8 hrs. The plate is removed from the bath, drained from adhering bath liquid, and dried. The same results as in Example I are obtained.

*Example VII*

An anodically oxidized aluminum plate prepared as described in Example I, is sealed in a bath prepared according to the invention and consisting of an aqueous solution, containing per liter thereof 2 g. of the sodium salt of an interpolymer obtained by polymerizing together vinyl acetate and maleic anhydride. The resulting interpolymer salt contains 2 acetate links per link of sodium maleate and has approximately the formula:

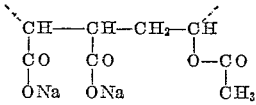

The interpolymer shows, dissolved in cyclohexanone at 20° C., a viscosity, reduced to 1% concentration, of 0.98 cps.

*Example VIII*

Example VII is repeated; however, instead of using the sodium salt, the sealing bath contains the triethanolamine salt of the same interpolymer. The results are the same as in Examples VIII and I.

*Example IX*

The same treatment as described in Example VII is repeated with a bath consisting of an aqueous solution of the sodium salt of an interpolymer of styrene and the acid obtained by hydrolization of maleic anhydride. The interpolymer contains approximately 1 link of styrene per 1 link of maleic anhydride, and the sodium salt has approximately the formula:

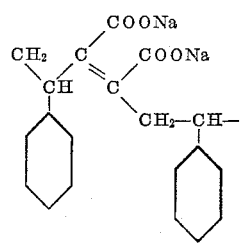

and shows, dissolved in cyclohexanone at 20° C., a limit viscosity of 1.2 cps.

Example X

An aluminum plate is anodically oxidized in the manner described in Example I and then immersed for sealing the oxidic layer according to the method of the invention in a sealing bath consisting of 40% by volume of acetone in mixture with 60% by volume of water in each liter of which there are dissolved, simultaneously, 1 g. of the triethanolamine salt of the acidic interpolymer obtained by polymerization of vinyl acetate and maleic anhydride and 2 g. of the potassium salt of the polystyrene sulfonic acid used in Example II. The sealing treatment is carried out at a bath temperature of 38° C. for about 8 hrs. The results surpass those obtained in Example II.

Example XI

An aluminum plate prepared as described in Example I is treated for about 6 hrs. in a sealing bath having a temperature of 45° C. and consisting of an aqueous solution containing, per kilogram, 6 g. of sodium perfluorocaprylate ($CF_3 \cdot (CF_2)_6 \cdot COONa$) and 4 g. of sodium polybutacrylate. The results are similar to those of the preceding examples but moreover the odor of the oxide layer is completely suppressed.

Example XII

An article of an aluminum base alloy containing 5% by weight of magnesium is chemically surface-oxidized by a known process. The article is then immersed for one night in an aqueous sealing bath containing 30% by volume of ethyl alcohol and 1% by weight of triethanolamine polystyrene sulfonate. The polystyrene sulfonic acid is derived in the same manner as in Example I. The pH of the bath is maintained at 6, and its temperature at 40° C. The resulting surface of the article is of attractive appearance and shows a resistance to corrosion which is clearly superior to that of surfaces treated in a known sealing bath.

Example XIII

An iron plate phosphatized by the method described in "Metals and Alloys," April 1939. The phosphatized plate is surface-sealed by immersion for ¾ hour in a boiling aqueous bath containing, per liter, 10 grams of triethanolamine polystyrene sulfonate of the same kind as used in Example XII. The pH of the solution is maintained at about 7, and the temperature of the bath is maintained near the boiling point. The results are the same as in the preceding example.

Example XIV

A phosphatized iron plate similar to that used in the preceding example is heated for 6 hours to about 60° C. in an aqueous solution containing, per liter, 15 grams of the sodium salt of a copolymer obtained by polymerization of a mixture of vinyl acetate, acrylic acid, and maleic anhydride. The copolymer contains approximately one monomeric unit of maleic anhydride per 10 units of vinyl acetate acrylic acid interpolymer. The sealed plate surface presents a most attractive appearance, and imparts a strong adherence to paint or varnish coatings.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. In a method of sealing an adsorbent inorganic protective layer formed on metallic surfaces by an anodic oxidizing electrolytical treatment, the steps comprising immersing the metallic surface bearing the aforesaid inorganic protective layer in a sealing bath containing in a concentration of from 0.01 to 15% by weight of at least one polymerized organic substance which is adsorbable by said inorganic protective layer and consists of monomeric units, each of which contains a chain of at least two carbon atoms linked to each other by a saturated bond, and at least two branch groups, at least one of which consists of a functional acidic group, each of said branch groups having a molecular weight above 15; at least two of said branch groups being acidic groups linked to two carbon atoms in alpha position relative to each other, when both said last-mentioned acidic groups are carboxylic groups, the pH of said bath being between 4 and 9, withdrawing the metallic surface from said sealing bath, rinsing the same with water to remove the excess of bath liquid unadsorbed by said inorganic layer from the latter, and drying the resultant sealed surface.

2. The method steps as described in claim 1, characterized in that the polymerized organic substance is sodium polystyrene sulfonate.

3. The method steps as described in claim 1, characterized by being carried out at a temperature between 15° C. and the boiling point of said bath.

4. The method steps as described in claim 1, characterized by being carried out at a temperature between 15° C. and 50° C.

5. In a method of sealing an adsorbent inorganic protective layer formed on metallic surfaces by an anodic oxidizing electrolytical treatment, the steps comprising immersing the metallic surface bearing the aforesaid inorganic protective layer into an aqueous sealing bath having a pH between 4 and 9, and a temperature between 15 and 50° C., and containing, in a concentration from 0.01 to 15% by weight of at least one polymerized organic substance which is adsorbable by said inorganic protective layer and consists of monomeric units, each of which contains a chain of at least two carbon atoms linked to each other by a saturated bond, and at least two branch groups, at least one of which consists of a functional acidic group, each of said branch groups having a molecular weight above 15; at least two of said branch groups being acidic groups linked to two carbon atoms in alpha position relative to each other when both of said last-mentioned acidic groups are carboxylic groups, withdrawing the metallic surface from said sealing bath, rinsing the same with water to remove the excess of bath liquid unadsorbed by said inorganic layer from the latter, and drying the resulting sealed surface.

6. In a method of protecting metallic surfaces, the combination of the successive treating steps of (a) forming an adsorbed inorganic protective layer on said metallic surface by anodically oxidizing said metallic surface, (b) immersing the so treated metallic surface in an aqueous bath containing in a concentration of from 0.01 to 15% by weight of at least one polymerized organic substance which is adsorbable by said inorganic protective layer and consists of monomeric units, each of which contains a chain of at least two carbon atoms linked to each other by a saturated bond and at least two branch groups, at least one of which consists of a functional acidic group, each of said branch groups having a molecular weight above 15; at least two of said branch groups being acidic groups linked to two carbon atoms in alpha position relative to each other, when both said last-mentioned acidic groups are carboxylic groups, (c) withdrawing the metallic surface from said sealing bath, (d) rinsing the same with water to remove the excess of bath liquid unadsorbed by said inorganic protective layer from the latter, and (e) drying the resultant sealed surface.

7. In a method of protecting a metal surface, the combination of the successive treating steps of (a) cleaning and degreasing the metallic surface, (b) anodically oxidizing said metallic surface, (c) immersing the resultant anodically oxidized surface in a boiling aqueous solution having a pH between 4 and 9 and containing the sodium polymerizate salt of a polystyrene sulfonic acid in a concentration of 10 grams per liter, (d) withdrawing the metallic surface from said solution, (e) rinsing the same with water to remove the excess of liquid unadsorbed by said metallic surface, and (f) drying the resultant sealed surface.

8. In a method of sealing an adsorbent inorganic protective layer formed on a metallic surface by an anodic oxidizing electrolytical treatment, the steps comprising immersing the metallic surface bearing the aforesaid inorganic layer in a sealing bath having a pH between 4 and 9, said bath containing in a concentration of 0.01 to 15% by weight of at least one polymerized organic substance which is adsorbable by said inorganic protective layer and consists of monomeric units, each of which contains a chain of at least two carbon atoms linked to each other by a saturated bond, and at least two branch groups, at least one of which consists of a functional acidic group, selected from the group consisting of the functions —COOH, —SO$_3$H, and PO$_3$H$_2$; the sodium and potassium salts, and methyl and ethyl esters of these acidic groups; each of said branch groups having a molecular weight above 15; at least two of said branch groups being acidic groups linked to two carbon atoms in alpha position relative to each other when both of said last-mentioned acidic groups are carboxylic groups, withdrawing the metallic surface from said sealing bath, rinsing the same with water to remove the excess of bath liquid unadsorbed by said inorganic layer from the latter, and drying the resulting sealed surface.

9. A metal article having an inorganic protective layer formed on a metallic surface by an anodic oxidizing electrolytical treatment and which is sealed by treatment with a bath consisting of an aqueous solution having a pH of between 4 and 9 and containing a salt of a polymeric organic substance which salt is adsorbable to said inorganic protective layer and consists of monomeric units, each of which contains at least two carbon atoms linked by a saturated bond to each other, two carboxylic groups linked each to one of the aforesaid carbon atoms so as to be in alpha position relative to each other.

10. A metal article as described in claim 9, further characterized in that said carboxylic groups are neutralized by sodium atoms.

11. A metal article as described in claim 9, further characterized in that said carboxylic groups are neutralized by triethanol amine.

12. A metal article as described in claim 9, characterized in that the polymeric organic compound is a polystyrene derivative selected from the group consisting of polystyrene sulfonic acids and the salts and esters of the same.

13. A metal article having an inorganic protective layer formed on a metallic surface by an anodic oxidizing electrolytical treatment, said protective layer being sealed by treatment of the same with a bath consisting of a solution having a pH between 4 and 9, said bath containing at least one polymerized organic substance which is adsorbable by said inorganic protective layer and consists of monomeric units, each of which contains a chain of at least two carbon atoms linked to each other by a saturated bond, and at least two branch groups, at least one of which consists of a functional acidic group selected from the group consisting of the functions —COOH, —SO$_3$H, and PO$_3$H$_2$; the sodium and potassium salts, and the lower alkyl esters of these acidic groups, each of said branch groups having a molecular weight above 15; at least two of said branch groups being acidic groups linked to two carbon atoms in alpha position relative to each other when both of said last-mentioned acidic groups are carboxylic groups, said protective layer containing adsorbed thereon said organic substance in amounts of about 0.1 to 15 grams per square meter of the sealed surface.

14. A metal article as described in claim 13, characterized in that the esters of the acidic group are ethanol amine esters.

15. A metal article as described in claim 13, characterized in that the sealing solution further contains as an adjuvant a second organic substance adsorbable by said inorganic protective layer, and consisting of molecules each of which comprises at least two carbon atoms linked with each other by a saturated bond of one electron pair, at least one acidic group, and at least two substituents, each of which is a halogen atom, and wherein all carbon atoms bearing halogen linkages are freed from a strong acid substituent; said acidic group being selected from the members of the group consisting of the carboxylic group —COOH, the sulfonic group —SO$_3$H, the phosphonic group —PO$_3$H$_2$, the sodium and potassium salts, and the lower alkyl esters of these acidic groups.

16. A metal article having an inorganic protective layer formed on metallic surfaces by an anodic oxidizing electrolytical treatment and which is sealed by treatment with a bath consisting of a solution containing at least one polymerized organic substance which is adsorbable by said inorganic protective layer and consists of monomeric units, each of which contains a chain of at least two carbon atoms linked to each other by a saturated bond, and at least two branch groups, at least one of which consists of a functional acidic group, each of said branch groups having a molecular weight above 15; at least two of said branch groups being acidic groups linked to the carbon atoms in alpha position relative to each other when both said last-mentioned acidic groups are carboxylic groups, said organic substance being present in the solution in a concentration of 0.01% to 15% by weight, said protective layer containing said organic substance adsorbed thereon in amounts of about 0.1 to 15 grams per square meter of the sealed surface.

References Cited in the file of this patent

UNITED STATES PATENTS

| | | |
|---|---|---|
| 2,324,739 | Stoops | July 20, 1943 |
| 2,348,705 | Alderman | May 16, 1944 |
| 2,356,879 | Pense | Aug. 29, 1944 |
| 2,718,514 | Fantl | Sept. 20, 1955 |
| 2,757,153 | Bowen | July 31, 1956 |
| 2,806,020 | Scott | Sept. 10, 1957 |
| 2,835,655 | Bauman | May 20, 1958 |
| 2,885,312 | McDonald | May 5, 1959 |
| 2,955,958 | Brown | Oct. 11, 1960 |